(12) United States Patent
Dhawan et al.

(10) Patent No.: US 7,516,078 B2
(45) Date of Patent: Apr. 7, 2009

(54) PERSONAL SHARED PLAYBACK

(75) Inventors: Anil Kumar Dhawan, Seattle, WA (US); Igor B. Peev, Seattle, WA (US); Zeke Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/140,511

(22) Filed: May 25, 2005

(65) Prior Publication Data

US 2006/0270395 A1    Nov. 30, 2006

(51) Int. Cl.
G10L 21/00 (2006.01)
G06F 15/16 (2006.01)
H04N 7/16 (2006.01)
H04H 40/00 (2008.01)

(52) U.S. Cl. .................. 704/375; 709/231; 725/135; 455/3.06

(58) Field of Classification Search .......... 707/200; 386/46; 455/553.1, 456, 418, 41.2, 41.3, 455/3.06; 709/248, 231; 725/135; 370/324; 704/375

See application file for complete search history.

(56) References Cited

U.S. PATENT DOCUMENTS

| | | | |
|---|---|---|---|
| 2006/0149850 A1* | 7/2006 | Bowman | 709/231 |
| 2006/0156375 A1* | 7/2006 | Konetski | 725/135 |
| 2006/0174313 A1* | 8/2006 | Ducheneaut et al. | 725/135 |
| 2006/0179160 A1* | 8/2006 | Uehara et al. | 709/248 |
| 2006/0242106 A1* | 10/2006 | Bank | 707/1 |
| 2007/0060132 A1* | 3/2007 | Wilhelmsson et al. | 455/445 |

* cited by examiner

*Primary Examiner*—Nick Corsaro
*Assistant Examiner*—Shannon R Brooks
(74) *Attorney, Agent, or Firm*—Merchant & Gould, P.C.

(57) ABSTRACT

Synchronization of a group of mobile devices so that each mobile device substantially simultaneously and synchronously plays a selected piece of content (e.g., a compressed music file). Implementations can selectively allow mobile devices to transfer content and control information via a wireless connection such as a Bluetooth connection. Via this data transfer, each mobile device can be synchronized with respect to content to be played and the timing of the playback. Each of the users of the group of mobile devices can have a personal experience (i.e., experiencing the playback without disturbing people that are not part of the group), but at the same time share the experience with the other users of the group. For example, users can experience a musical performance in a public place that no one but themselves can hear.

20 Claims, 4 Drawing Sheets

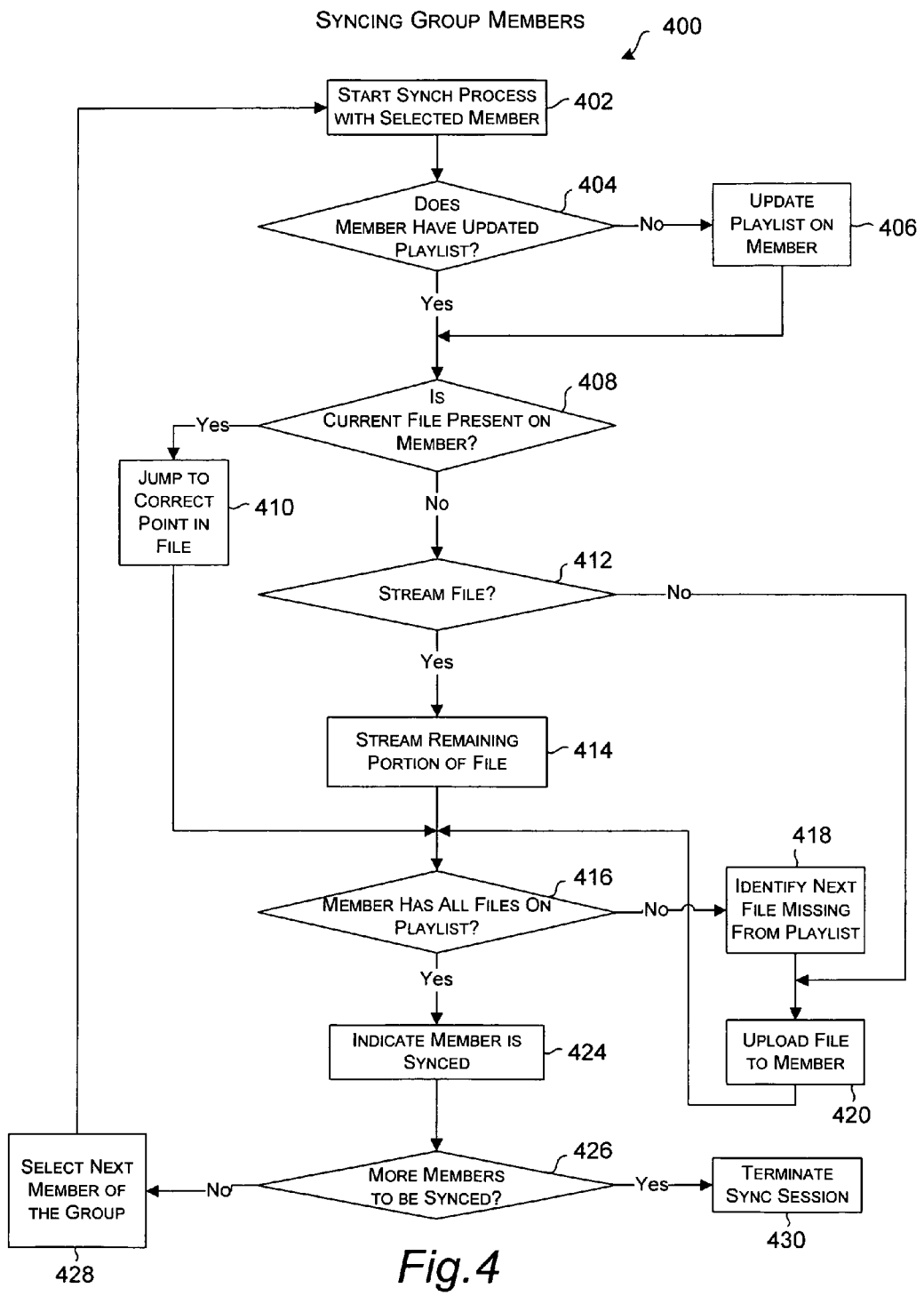

PERSONAL SHARED PLAYBACK

BACKGROUND

Small, handheld electronic devices have been steadily growing in popularity in recent years. Such devices include handheld music players, cellular telephones, and handheld computing devices (known by different names, such as palmtops, pocket computers, personal digital assistants, personal organizers, H/PCs, or the like). These devices, hereinafter "mobile devices" provide much of the same functionality as their larger laptop, notebook and desktop computers. In particular, mobile devices provide many functions to users including word processing, task management, spreadsheet processing, address book functions, Internet browsing, and calendaring, as well as many other functions in addition to voice communications. Mobile devices can provide functionality to store and play content or files such as music, provide a user interface to allow a user to play games, and/or support a wireless communication system such as Bluetooth. In addition, such mobile devices often support headset/earphone/earbud type audio output devices so that users can hear audio output without disturbing others. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to various aspects, implementations to synchronize a group of mobile devices so that each mobile device substantially simultaneously and synchronously plays a selected file or piece of content (i.e., playback data) are disclosed. Playback data can include files or content such as, for example, compressed music files (e.g. mp3 files, wmv files, etc.), streaming media, data used in multi-user interactive games, etc. In one aspect, implementations are disclosed that allow mobile devices to transfer content and control information via a wireless connection such as a Bluetooth connection. Via this data transfer, each mobile device can be synchronized with respect to files and/or content to be played and the timing of the playback. According to this aspect, a personal shared playback of a file or content can be experienced by the group. That is, each of the users of the group of mobile devices can have a personal experience (i.e., experiencing the playback without disturbing people that are not part of the group), but at the same time share the experience with the other users of the group. Using a music example, the users can, in effect, experience a musical performance in public that no one but themselves can hear.

In another aspect, a leader is negotiated for the group of mobile devices. The leader can determine whether playback data currently being synchronously played by the group is present in all of the members of the group. If a group member does not have the playback data, the leader can transfer the playback data (or a portion of the playback data) to the member over the wireless connection. In a related aspect, the leader can determine whether to transfer a "missing" file to a group member in the form of a file upload to the member, or by streaming the unplayed portion of the file to the member.

In still another aspect, the leader can create/modify a playlist of files/content to be played. The leader can then distribute the playlist (or modified playlist) to the other members of the group. For example, the leader can multicast the playlist to the group. In a further refinement, the playlist may include one or more timestamps as metadata, which can be used to synchronize the playback of the files listed in the playlist and identify the playlist. This aspect allows the entire group to know which file/content to play next and when to play it, allowing the group to be synchronized with respect to playback of files/content.

In yet another aspect, the leader can also determine if a group member is missing a file/content listed on the playlist and start transferring the corresponding playback data (or a pointer to playback data) to that user. In a related aspect, the transfer of playback data can occur while other playback data is being played (i.e., "background" file transfer). This related aspect allows the group to be easily synchronized with respect to files or content, and without requiring user-input.

In another aspect, the leader can also select and distribute to the group one or more settings to be used in playing the playback data. For example, the leader can select one or more audio settings such as bass, treble, fade, etc. and distribute the setting(s) as metadata included with the playlist.

Various embodiments may be implemented as a computer process, a computing system (not limited to mobile devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a flow diagram illustrating operational flow in synchronizing content and playback in a group of mobile devices, according to one embodiment.

DETAILED DESCRIPTION OF ILLUSTRATED EMBODIMENTS

Embodiments are described more fully below with reference to the accompanying drawings, which form a part hereof, and which show specific exemplary non-limiting embodiments for practicing the invention. However, embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
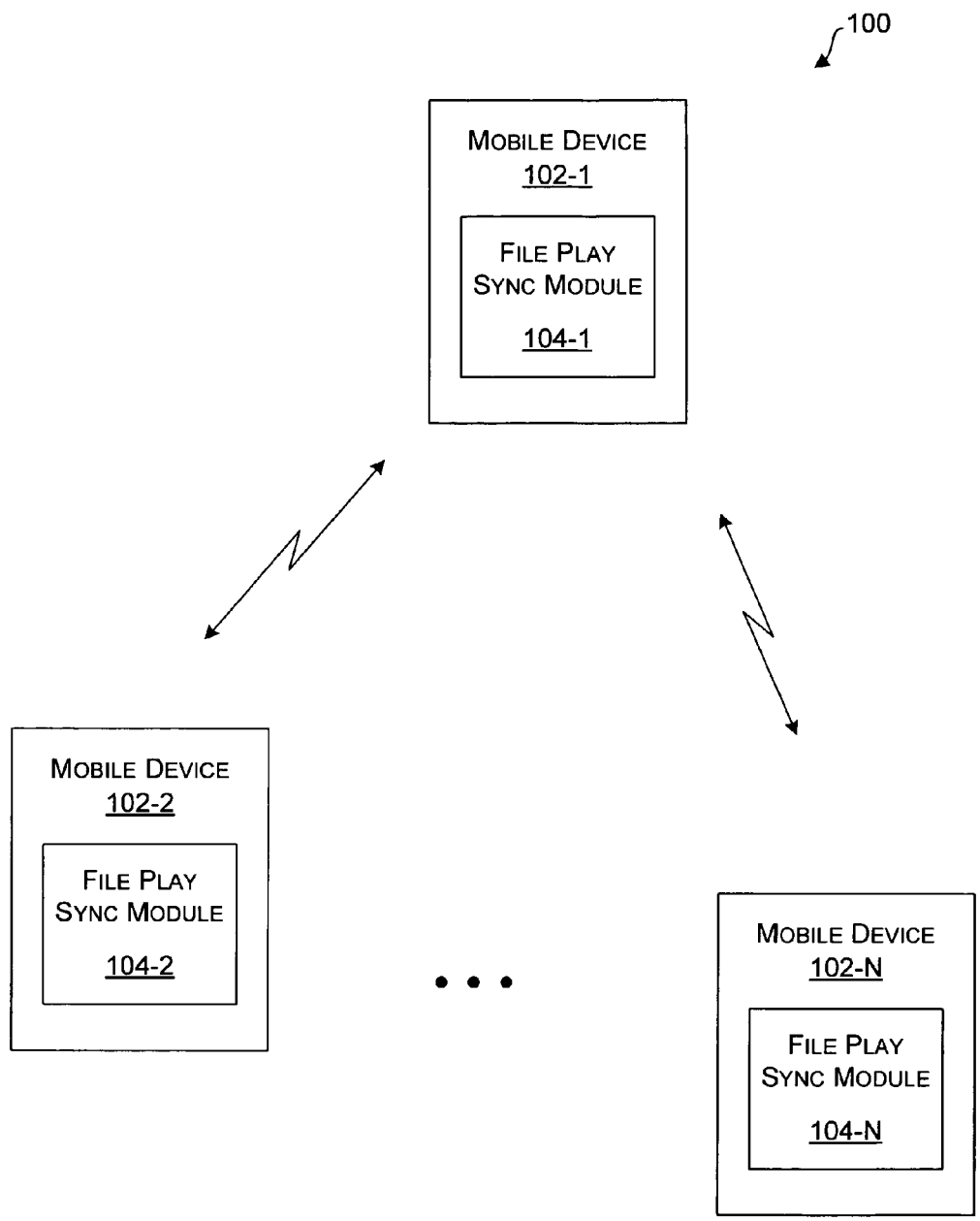
FIG. 1 is a diagram illustrating an exemplary system that supports synchronization of content and playback of the content among a group of mobile devices, according to one embodiment.

FIG. 1 illustrates an exemplary system 100 that supports synchronization of content and playback of the content among a group of mobile devices, according to one embodiment. In this embodiment, system 100 includes a group of mobile devices 102-1 through 102-N. As previously mentioned, mobile devices are devices that can store and playback content, files, etc. This functionality can be incorporated into dedicated media players, handheld computing devices, cellular telephones, handheld game players, PDAs, etc. Further, in this embodiment, mobile devices 102-1 through 102-N can transfer date to each other via a wireless communication system such as, for example, a Bluetooth system. In some embodiments, the communication architecture can be peer-to-peer architecture, while in other embodiments the communication architecture can be master-slave architecture. In some embodiments, the wireless communication system can support multicasting of files and/or syncing information.

In accordance with this embodiment, mobile devices 102-1 through 102-N respectively include file play sync modules 104-1 through 104-N (also referred to herein as sync modules). In some embodiments, sync modules 104-1 through 104-N allow mobile devices 102-1 through 102-N to transfer files or content and timing information to each other so that each mobile device can play the same files or content at substantially the same time so that the users have a shared experience. Depending on the context, the term "synchronized" (and its derivatives) can refer to this transfer of timing information and files or content so that mobile devices are "synchronized" with respect to the files or content to be played back (i.e., each mobile device has all of the files or content to be played), and the timing of the playback (i.e., each mobile device will be able play the file or content at substantially the same time). The files/content being played back can include music files (compressed or uncompressed), data used in multi-user interactive games, streaming media, etc. The term "playback data" is sometimes used herein to refer to such files and/or content.

In one embodiment, users of mobile devices 102-1 through 102-N perform a discovery and negotiation process to form a group. For example, mobile devices can request to join the group, which the group or a leader of the group can accept or reject. The group then performs operations so that each mobile device is synchronized with respect to files/content and playback timing. In this embodiment, mobile devices 102-1 through 102-N transfer data to each other to perform this synchronization process via a wireless communication system. In particular, sync modules 104-1 through 104-N of mobile devices 102-1 through 102-N handle the synchronization process.

For example, in some embodiments, one of sync modules 104-1 through 104-N serves as a leader to: (a) provide a playlist of files and/or content to be synchronously played by all of mobile devices 102-1 through 102-N; (b) ensure that each of mobile devices 102-1 through 102-N has (at least temporarily) all of the files on the playlist; and (c) ensure that each of mobile devices 102-1 through 102-N has timing information (e.g., a time stamp) so that mobile devices 102-1 through 102-N can synchronously play the files on the playlist.

In some embodiments, the leader can also provide playback settings (e.g., bass, treble, fade) along with the playlist information so that the playback experience can be shared with more accuracy. In still other embodiments, protected files/content (e.g., content with digital rights management or DRM protection) can be shared between mobile devices 102-1 through 102-N with the protection mechanisms intact so that the files/content adhere to rights/permissions granted by the protection mechanisms. For example, some content can be "previewed" (e.g., allowed to be played once or other fixed number of times, within a certain time period, etc.) without having to purchase a license or pay fees.

Figure 2:
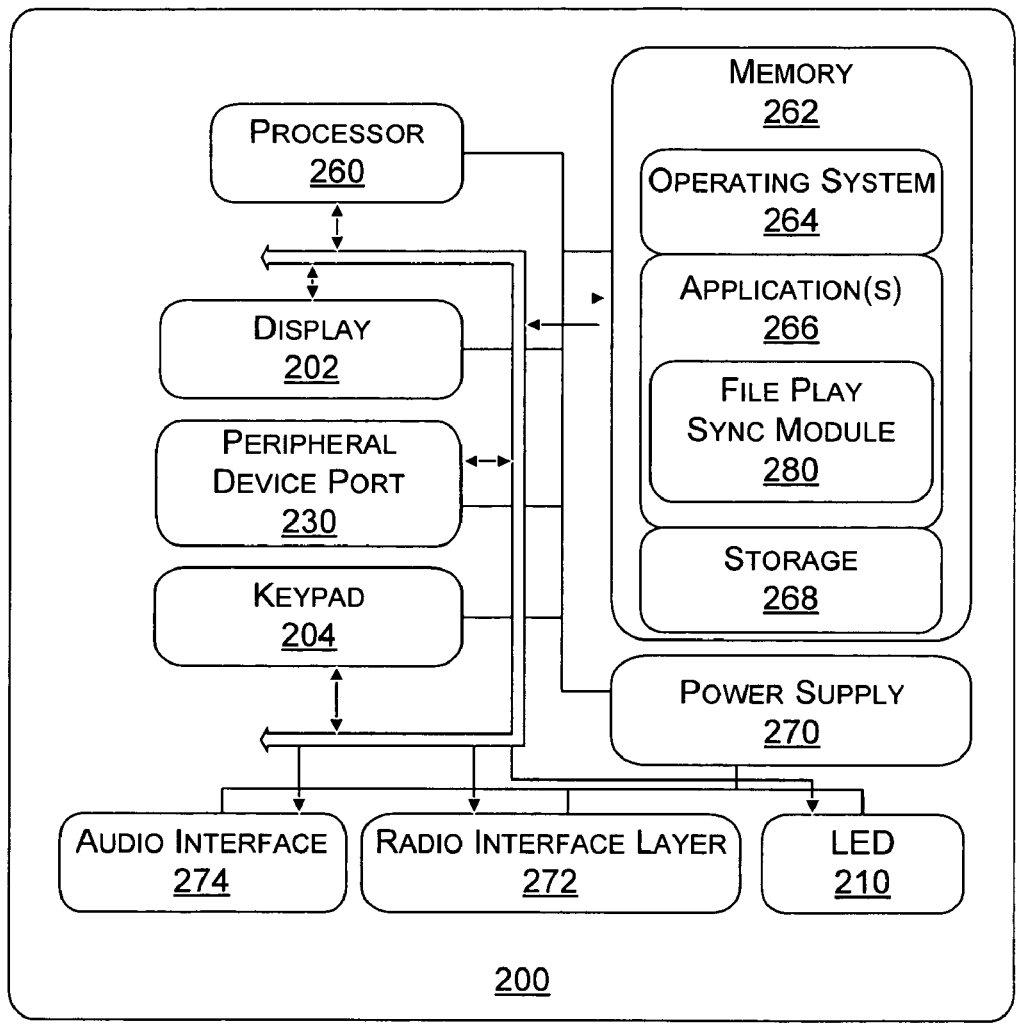
FIG. 2 is a block diagram illustrating components of a mobile device used in an embodiment.

FIG. 2 illustrates an example embodiment of a system 200 used in one of mobile devices 102-1 through 102-N shown in FIG. 1. For example, mobile device 102-1 (FIG. 1) can incorporate system 200 to implement or serve as a computing environment for an embodiment.

In this embodiment, system 200 has a processor 260, a memory 262, display 202, and keypad 204. Memory 262 generally includes both volatile memory (e.g., RAM) and non-volatile memory (e.g., ROM, Flash Memory, or the like). The system 200 includes an OS 264, which in this embodiment is resident in a flash memory portion of memory 262 and executes on processor 260. Keypad 204 may be a push button numeric dialing pad (such as on a typical telephone), a multi-key keyboard (such as a conventional keyboard), or may not be included in the mobile computing device in deference to a touch screen or stylus. Display 202 may be a liquid crystal display, or any other type of display commonly used in mobile computing devices. Display 202 may be touch-sensitive, and would then also act as an input device.

One or more application programs 266 are loaded into memory 262 and run on operating system 264. Examples of application programs include phone dialer programs, e-mail programs, PIM (personal information management) programs, word processing programs, spreadsheet programs, Internet browser programs, wireless communication programs, and so forth. In one embodiment, application programs 266 include a sync module or application 280 (e.g., corresponding to sync module 104-1 in one embodiment) that can support file/content and timing synchronization (as described above in conjunction with FIG. 1 for system 100). System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, contact information used by a PIM, appointment information used by calendaring application 280, documents used by a word processing application, and the like. In some embodiments, non-volatile storage 268 includes the aforementioned flash memory in which the OS (and possibly other software) is stored.

System 200 has a power supply 270, which may be implemented as one or more batteries. Power supply 270 might further include an external power source, such as an AC adapter or a powered docking cradle that supplements or recharges the batteries.

System 200 is also shown with two types of external notification mechanisms: LED 210, and an audio interface 274 that can be used with a speaker, headset, and/or earphone (not shown) to provide audio notifications as well as audio playback of files/content. These devices may be directly coupled to power supply 270 so that when activated, they remain on for a duration dictated by the notification mechanism even though processor 260 and other components might shut down to conserve battery power. LED 210 may be programmed to remain on indefinitely until the user takes action to indicate the powered-on status of the device. Audio interface 274 is used to provide audible signals to and receive audible signals from the user. For example, in addition to being coupled to a headset, audio interface 274 may also be coupled to a microphone to receive audible input, such as to facilitate a telephone conversation.

System 200 also includes a radio 272 that performs the function of transmitting and receiving radio frequency communications. Radio 272 facilitates wireless connectivity between system 200 and the "outside world", via a communications carrier or service provider. For example, radio 272 may support wireless communication using a Bluetooth system, as well as cellular telephone communication. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Example Operational Flow of a Synchronizable Group of Mobile Devices

Figure 3:
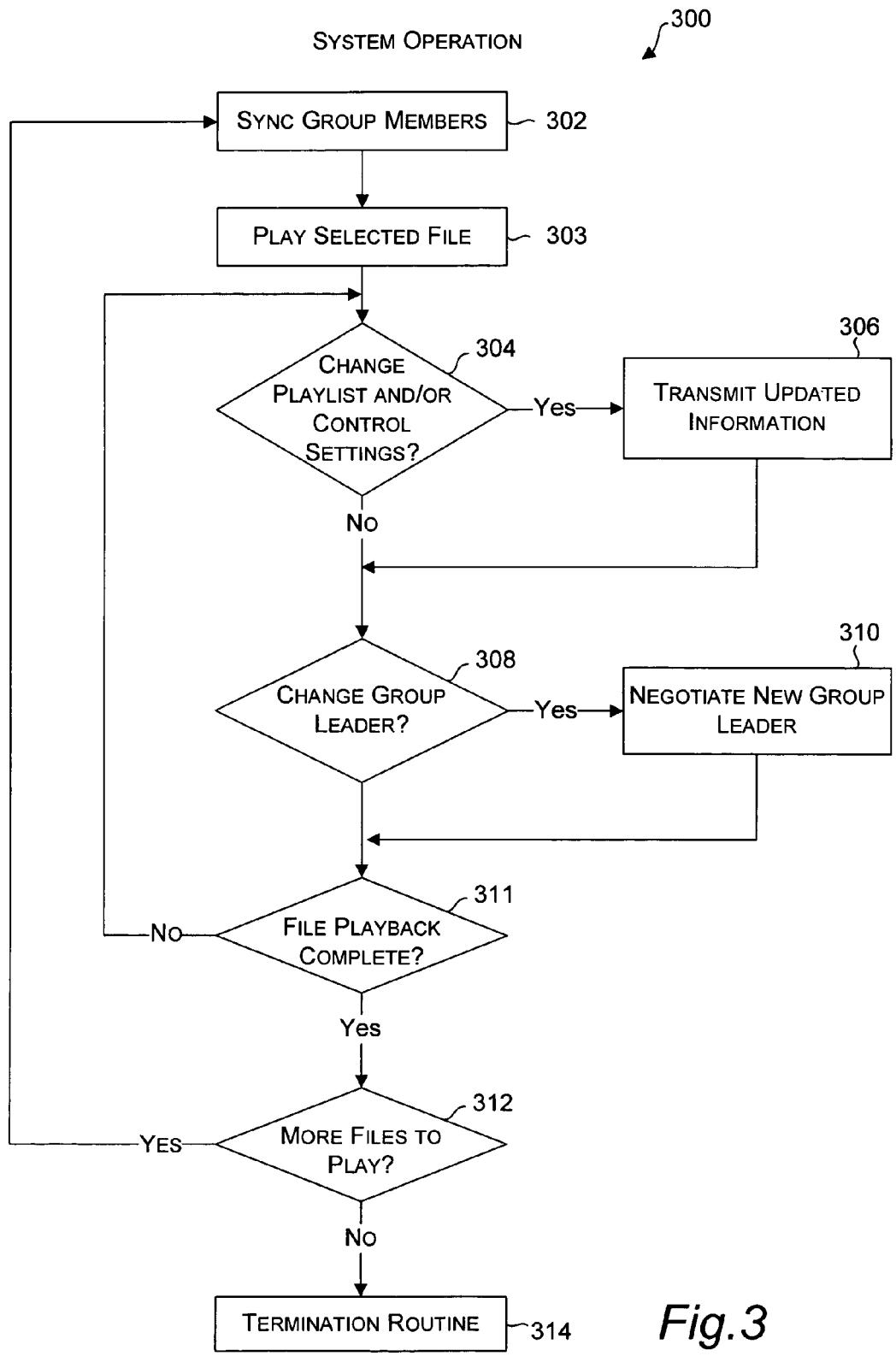
FIG. 3 is a flow diagram illustrating operational flow of a system that supports synchronization of content and playback among a group of mobile devices, according to one embodiment.

FIG. 3 illustrates operational flow 300 of a system that supports synchronization of content and playback among a group of mobile devices, according to one embodiment. Operational flow 300 may be performed in any suitable computing environment. For example, operational flow 300 may be executed by system 100 (FIG. 1) to synchronization of content and playback among a group of mobile devices 102-1 through 102-N. Therefore, the description of operational flow 300 may refer to at least one of the components of FIG. 1. However, any such reference to components of FIG. 1 is for descriptive purposes only, and it is to be understood that the implementations of FIG. 1 are a non-limiting environment for operational flow 300.

At a block 302, mobile devices of a group of mobile devices are synchronized. In one embodiment, mobile devices such as mobile devices 102-1 through 102-N (FIG. 1) perform a synchronization process so that each mobile device has files/content to be played and timing information so that each of the mobile devices plays the same song at substantially the same time. For example, a first mobile device may be configured or enabled to determine whether a second mobile device has all of the files/content to be played (first and second are used to for distinguishing between mobile devices—not to imply an order). The first mobile device can then transfer one or more files or content to the second mobile device using an upload process or a streaming process or a combination of both. Also, in some embodiments, the synchronization process of block 302 can be performed while the mobile devices are playing a file. This background synchronization can make the synchronization process relatively transparent to the users. One embodiment of this operation is described in more detail below in conjunction with FIG. 4. Operational flow 300 can then proceed to a block 303.

At a block 303, the mobile devices of the group play the current or selected file/content. Ideally, all of the mobile devices play the same file/content at the same time. In some embodiments, there may be slight errors in the playback synchronization that are not significant enough to prevent the users of the group from enjoying the shared experience. For example, some differences in playback synchronization of an audio signal may not be perceived by human listeners. Operational flow 300 can then proceed to a block 304.

At block 304, it is determined whether a change regarding the files or content to be played has taken place. For example, one or more of the following may be changed: (a) files or content may be added a playlist of files/content to be played; (b) files or content may be deleted from the playlist of files/content to be played or the order in which the files; (c) the order in which files/content is played may change; and (d) control settings (e.g., bass, treble, fade, etc.) for playing the files/content may be changed. This list of items that can be changed is illustrative and not exhaustive. In other embodiments, other items may also be changed.

In one exemplary embodiment, one of the mobile devices is a "leader" that allows its user to add or delete files/content to be played, change the order of the files/content to be played, change control settings, etc. The leader can determine if other mobile devices of the group do not have all of the files/content to be played, out-dated control settings, etc. In one embodiment, this operation is performed by the leader by sending a request to each other mobile device of the group. This request causes each of the mobile devices of the group to determine whether it has stored each of the files/content on the playlist and to respond to the leader with the names of the "missing" files/content (if any) and with the time stamps of control settings. If it is determined that a change regarding the files or content or control settings has taken place, operational flow 300 can proceed to a block 306. If not, operational flow 300 can proceed to a block 308 (described further below).

At block 306, the updated files/content and/or playback information is provided to the "deficient" mobile devices of the group. In one embodiment, the mobile device that is the leader can initiate appropriate processes to update the "deficient" mobile device(s) with the missing files/content and/or playback information (which includes playback order and playback timing information). In an alternative embodiment, the "leader" mobile device can provide appropriate pointers to canonical locations (e.g., a URLs) to the "deficient" mobile devices. These mobile devices would then download/stream the files/content from the specified locations. This alternative embodiment may in some scenarios simplify operations related to digital rights management (DRM). For example, in one embodiment, the leader can multicast playlist information that includes playback information, and then upload and/or stream file(s) or content to individual mobile devices on an ad hoc basis so that each mobile device is capable of playing the desired file(s) or content. Operational flow can then proceed to block 308.

At block 308, it is determined whether the leader has changed. In some embodiments, the role of leader may be changed on an ad hoc basis (for example, when a user of one of the mobile devices in the group) wishes to add or delete files to be played, change control settings, etc. In other scenarios, the user of the current leader may no longer want to be leader, may wish to leave the group, can no longer communicate with the rest of the group (e.g., goes out of its Bluetooth unit's range), etc. If it is determined that a new leader is needed, operational flow 300 can proceed to a block 310. If not, operational flow 300 can proceed to a block 311 (described further below).

At block 310, a new leader from the group of mobile devices is negotiated or selected. In some embodiments, the role of leader can be passed from one mobile device to another mobile device using conventional techniques. For example, a mobile device wishing to be the leader may send a request to the current leader to pass the role to requesting device. In another embodiment, a user that changes the playlist or a control setting on the user's mobile device may cause that mobile device to respond to the change(s) by initiating a negotiation process to become the leader. For example, in one embodiment, that mobile device may perform standard multiple access processes (e.g., CSMA—carrier sense multiple access) to transmit the updated information to the other mobile devices, thereby effectively becoming the leader. If that user's mobile device becomes the leader, then the user's mobile device can initiate the synchronization process again so that all of the mobile devices in the group will be updated with the changes. Operational flow 300 can then proceed to block 311.

At block 311, it is determined whether the current file/content playback is complete. In some embodiments, the leader mobile device makes this determination by monitoring its own playback. If it is determined that the current playback is not completed, operational flow 300 can return to block 304 (or blocks 308 or the start of block 311 in other embodiments). If completed, operational flow 300 can proceed to a block 312.

At block 312, it is determined whether there is more files/content to be played. In some embodiments, the leader mobile device determines whether there are more files or content to be played. For example, the leader can monitor its own playlist of files/content to be played to determine. If it is determined that there are more files/content to be played, in one embodiment operational flow 300 can return to block 302 to perform the sync process again. This will provide a mechanism to maintain synchronization. For example, a mobile device of the group may wander out of the range of the wireless communication system for a period of time and then later comes back into range. If the playlist and/or playback information had changed during that interval, the "wandering" mobile device will be transparently re-synced to continue to enjoy the shared playback experience. However, if it is determined that there are no more files/content to be played, operational flow 300 can proceed to a block 314. At block 314, the mobile devices perform a termination routine that may include prompting users for more files/content to be played, terminating one or more processes that were running on the mobile devices during the shared playback experience (e.g., powering down the wireless communication system to conserve power), etc.

Although operational flow 300 is illustrated and described sequentially in a particular order, in other embodiments, the operations described in the blocks may be performed in different orders, multiple times, and/or in parallel. Further, one or more operations described in the blocks may be omitted or combined in some embodiments.

Example Operational Flow in Synchronizing a Mobile Device

FIG. 4 illustrates operational flow 400 in synchronizing content and playback in a group of mobile devices, according to one embodiment. Operational flow 400 may be performed in any suitable computing environment. For example, operational flow 400 may be executed by a mobile device of system 100 (FIG. 1) to synchronization of content and playback among mobile devices 102-1 through 102-N. Therefore, the description of operational flow 400 may refer to at least one of the components of FIG. 1. However, any such reference to components of FIG. 1 is for descriptive purposes only, and it is to be understood that the implementations of FIG. 1 are a non-limiting environment for operational flow 400. In one embodiment, operational flow 400 is used in implementing block 302 (FIG. 3).

At a block 402, a synchronization process is started with a selected mobile device of the group. In one embodiment, the group members (mobile devices) can communicate with each other via a wireless communication system such as, for example, a Bluetooth system. In this embodiment, a mobile device serving as a leader (also referred to as the "leader mobile device") can initiate a synchronization session with another mobile device of the group (in this context also referred to as the "target mobile device") via the wireless communication system. For example, the leader may initiate the session by sending a message or request to the target mobile device (e.g., a request for information about the target mobile device's playlist, playback timing information, etc.). In one embodiment, each mobile device of the group other than the leader mobile device undergoes this synchronization process in a single synchronization session. Operational flow 400 can then proceed to a block 404.

At block 404, it is determined whether the group member has an up-to-date playlist. In one embodiment, the aforementioned leader mobile device determines whether the target mobile device has an up-to-date playlist. For example, in some embodiments a playlist has a timestamp for when it was created. The leader mobile device can send a message containing the playlist timestamp to the target mobile device requesting the target device to compare its playlist timestamp with the timestamp included in the message. The target device would then respond with an indication of whether the playlist timestamps match. In an alternative embodiment, the leader mobile device can send a message with a request the playlist timestamp to the target mobile device. The leader mobile device can then compare the playlist timestamps to determine if the target mobile device has an up-to-date playlist. If it is determined that the target mobile device's playlist needs to be updated, operation flow 400 can proceed to a block 406. If not, operational flow 400 can proceed to a block 408 (described further below).

At block 406, the playlist is updated on the group member. In one embodiment, the aforementioned leader mobile device can send (including multicast) the up-to-date playlist to the target mobile device via the wireless communication system. Operational flow 400 can then proceed to block 408.

At block 408, it is determined whether a currently playing file/content (or a next file/content if nothing is currently being played) is present on the group member. In one embodiment, the aforementioned leader mobile device can determine whether the target mobile device has the currently playing file/content by sending a message(s) to the target mobile device requesting that the target mobile device send an indication of whether the file is present on the target device. For example, the leader mobile device may send a message requesting the target mobile device to provide the name of every file/content listed on the playlist that is not present on the target device. If it is determined that the current file/content is present on the target mobile device, operation flow 400 can proceed to a block 410.

At block 410, the target device is instructed to "jump" to the correct playback point in the current file/content. In one embodiment, the aforementioned leader mobile device provides the correct playback point to the target mobile device along with a "start" time at which to start playing the file/content from the playback point. The leader mobile device can select this "start" time to account for the time needed to transmit the message containing the playback point and be received and processed by the target mobile device. Operational flow 400 can then proceed to a block 416, described further below.

Returning to block 408, if it is determined that the current file/content is not present on the target mobile device, operational flow 400 can proceed to a block 412.

At block 412, it is determined whether to upload the current file/content to the target mobile device, or to stream the remaining portion of the current file/content to the target mobile device. In one embodiment, the aforementioned leader mobile device bases this decision on criteria such as the amount of resources (e.g., power, time, etc.) needed to stream the remaining portion of the current file/content compared to that needed to upload the entire file/content to the target device. If it is decided to stream the remaining portion of the current file/content, operational flow 400 can proceed to a block 414. If not, operational flow 400 can proceed to a block 420, described further below.

At block 414, the remaining portion of the current file/content is provided to the target device. In some embodiments, the leader mobile device can stream the file/content portion to the target device. In other embodiments, the leader mobile device can cause another entity (e.g., a media server) external to the group of mobile devices to stream the media to the target mobile device. Operational flow 400 can then proceed to a block 416.

At block 416, it is determined whether the target device has all of the files/content listed on the updated playlist (see block 404). In one embodiment, the leader mobile device can determine whether the target mobile device has all of the files/content listed in the updated playlist by sending a message(s) to the target mobile device requesting that the target mobile device to provide the name of every file/content listed on the playlist that is not present on the target device. In one embodiment, the operations of block 416 have already been performed at block 404. If it is determined that the target mobile device does not have all of the files/content listed on the updated playlist, operation flow 400 can proceed to a block 418. However, if it is determined that the target mobile device does have all of the files/content listed on the updated playlist, operational flow can proceed to a block 424, described further below.

At block 418, a file/content that is not stored on the target device is identified. In one embodiment, the leader mobile device can identify the next "missing" file/content by analyzing the list of files/content obtained at block 416. Operational flow 400 can then proceed to a block 420.

At block 420, the file/content identified at block 418 is uploaded to the target mobile device. In one embodiment, the leader mobile device can upload the file/content portion to the target device. In other embodiments, the leader mobile device can cause another of the mobile devices in the group to upload the identified file/content to the target mobile device. In still other embodiments, the leader mobile device can cause another entity (e.g., a media server) external to the group of mobile devices to stream the media to the target mobile device. Operational flow 400 can then return to block 416.

At block 424, an indication is provided that the target device is synchronized during the present synchronization session. In one embodiment, leader mobile device may indicate that a target device is synchronized by moving to the next mobile device in a list of the mobile devices that have been accepted into the group. In other embodiments, a flag may be associated with each mobile device of the group that when set indicates that the corresponding mobile device has gone through the synchronization process during the present synchronization session. For example, the synchronization process for a particular mobile device may have failed, but the flag is set so that synchronization can proceed for the other mobile devices of the group. Operational flow 400 can then proceed to a block 426.

At block 426, it is determined whether all of the mobile devices of the group have been synchronized (including any that have gone through the synchronization process but failed) during the present synchronization session. In one embodiment, the leader mobile device determines if all of the mobile devices of group have been synchronized during the present session by examining the flags described above in conjunction with block 424. In other embodiments, the leader mobile device knows when all of the mobile devices of the group have gone through the synchronization process during the present session when it has traversed the list of mobile devices (also described at block 424). If it is determined that all members of the group were not synchronized, operational flow 400 can proceed to a block 428. However, if it is determined that all members of the group were synchronized, operational flow 400 can proceed to a block 430, described further below.

At block 428, a next mobile device of the group that has not been synchronized during the present synchronization session is selected. In one embodiment, the leader mobile device selects one of the un-synchronized mobile devices identified at block 426. Operational flow 400 can then return to block 402 to begin the synchronization process for the newly selected mobile device.

At block 430, the synchronization session is terminated. In one embodiment, the leader mobile device clears the "synchronized" flags (see block 424) as part of terminating the session. The overall operational flow (that includes operational flow 400) can then proceed to the next operation(s).

Although operational flow 400 is illustrated and described sequentially in a particular order, in other embodiments, the operations described in the blocks may be performed in different orders, multiple times, and/or in parallel. Further, in some embodiments, one or more operations described in the blocks may be omitted or combined.

Although the invention has been described in language specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for synchronizing a group of mobile devices that can play playback data, wherein playback data includes files, links to files, or streaming content or a combination of the three, the method comprising:

determining a leader mobile device from the group of mobile devices; wherein the leader may be determined from each of the group of mobile devices; wherein the leader mobile device changes on an ad hoc basis; and wherein the leader mobile device is in charge of synchronizing the group of mobile devices; and wherein the leader automatically changes to a different mobile device within the group when the different mobile device alters the playback data by adding or deleting playback data;

automatically determining whether a mobile device contains a portion of playback data and a playlist; wherein the determination includes the leader sending a request to the mobile device that causes the mobile device to determine whether it has stored each of the files on the playlist and to respond to the leader with the names of any files that are missing from the playlist along with time stamps of control settings;

providing the portion of playback data to the mobile device via a wireless communication system in response to a determination that the mobile device did not contain the portion of playback data, wherein the portion of playback data is for synchronous playing by the group of mobile devices; and providing information to the mobile device via the wireless communication system, the information defining a point in the portion of playback data at which the mobile device is to begin playing the portion of playback data in response to a determination that the mobile device did contain the portion of playback data; wherein each of the mobile devices in the group is configured to play the same playback data at approximately the same time such that the playback data is experienced by the entire group.

2. The method of claim 1 wherein the determining occurs while at least one of the group of mobile devices is playing the portion of playback data.

3. The method of claim 1 further comprising determining whether each of the mobile devices of the group has the playlist that includes an up-to-date listing of one or more portions of playback data to be synchronously played by the group of mobile devices.

4. The method of claim 3 further comprising modifying the playlist during the playing of the portion of playback data.

5. The method of claim 3 wherein the playlist includes metadata used to indicate when another portion of playback data is to be synchronously played by the group of mobile devices.

6. The method of claim 3 wherein the playlist includes metadata used to provide one or more settings used in playing the portion of playback data.

7. The method of claim 1 wherein providing the portion of playback data further comprises uploading the portion of playback data to the mobile device.

8. The method of claim 1 wherein providing the portion of playback data further comprises causing a sub-portion of the portion of playback data to be streamed to the mobile device.

9. The method of claim 1 wherein the leader mobile device is to selectively provide the portion of the playback data to the mobile device in response to a determination that the mobile device did not contain the portion of playback data and is to selectively provide the information to the mobile device.

10. The method of claim 8 wherein the leader mobile device can be changed to another of the group of mobile devices.

11. The method of claim 1 further comprising uploading another portion of playback data to the mobile device while the portion of playback data is being played, wherein the another portion of playback data is to be synchronously played by the group of mobile devices sometime after completing the playing of the portion of playback data.

12. One or more computer readable media having stored thereon instructions that when executed perform operations comprising:

determining a leader mobile device from the group of mobile devices; wherein the leader may be determined from each of the group of mobile devices; wherein the leader mobile device changes on an ad hoc basis; and wherein the leader mobile device is in charge of synchronizing the group of mobile devices; and wherein the leader mobile device automatically changes to a different mobile device within the group when the different mobile device alters the playback data by adding or deleting playback data;

automatically determining whether a mobile device contains a portion of playback data and a playlist; wherein the determination includes the leader sending a request to the mobile device that causes the mobile device to determine whether it has stored each of the files on the playlist and to respond to the leader with the names of any files that are missing from the playlist along with time stamps of control settings;

providing the portion of playback data to the mobile device via a wireless communication system in response to a determination that the mobile device did not contain the portion of playback data, wherein the portion of playback data is for synchronous playing by the group of mobile devices; and providing information to the mobile device via the wireless communication system, the information defining a point in the portion of playback data at which the mobile device is to begin playing the portion of playback data in response to a determination that the mobile device did contain the portion of playback data.

13. The one or more computer readable media of claim 12 wherein the operations further comprise determining whether a mobile device of the group has a playlist that includes an up-to-date listing of one or more portions of playback data to be synchronously played by the group of mobile devices.

14. The one or more computer readable media of claim 13 wherein the operations further comprise modifying the playlist during the playing of the portion of playback data.

15. The one or more computer readable media of claim 13 wherein the playlist includes metadata used to indicate when another portion of playback data is to be synchronously played by the group of mobile devices.

16. The one or more computer readable media of claim 13 wherein the playlist includes metadata used to provide one or more settings used in playing the portion of playback data.

17. A system for synchronizing a group of mobile devices that can play playback data, wherein playback data includes files or streaming content or both, the system comprising:

means for determining a leader mobile device from the group of mobile devices; wherein the leader may be determined from each of the group of mobile devices; wherein the leader mobile device changes on an ad hoc basis; and wherein the leader mobile device is in charge of synchronizing the group of mobile devices; and wherein the leader automatically changes to a different mobile device within the group when the different mobile device alters the playback data by adding or deleting playback data;

means for automatically determining whether a mobile device contains a portion of playback data; and a playlist; wherein the determination includes the leader sending a request to the mobile device that causes the mobile device to determine whether it has stored each of the files on the playlist and to respond to the leader with the names of any files that are missing from the playlist along with time stamps of control settings;

means for providing the portion of playback data to the mobile device via a wireless communication system in response to a determination that the mobile device did not contain the portion of playback data, wherein the portion of playback data is for synchronous playing by the group of mobile devices; and means for providing information to the mobile device via the wireless communication system, the information defining a point in the portion of playback data at which the mobile device is to begin playing the portion of playback data in response to a determination that the mobile device did contain the portion of playback data.

18. The system of claim 17 further comprising means for determining whether a mobile device of the group has a playlist that includes an up-to-date listing of one or more portions of playback data to be synchronously played by the group of mobile devices.

19. The system of claim 18 wherein the playlist includes metadata used to indicate when another portion of playback data is to be synchronously played by the group of mobile devices.

20. The system of claim 18 wherein the playlist includes metadata used to provide one or more settings used in playing the portion of playback data.

* * * * *